UNITED STATES PATENT OFFICE.

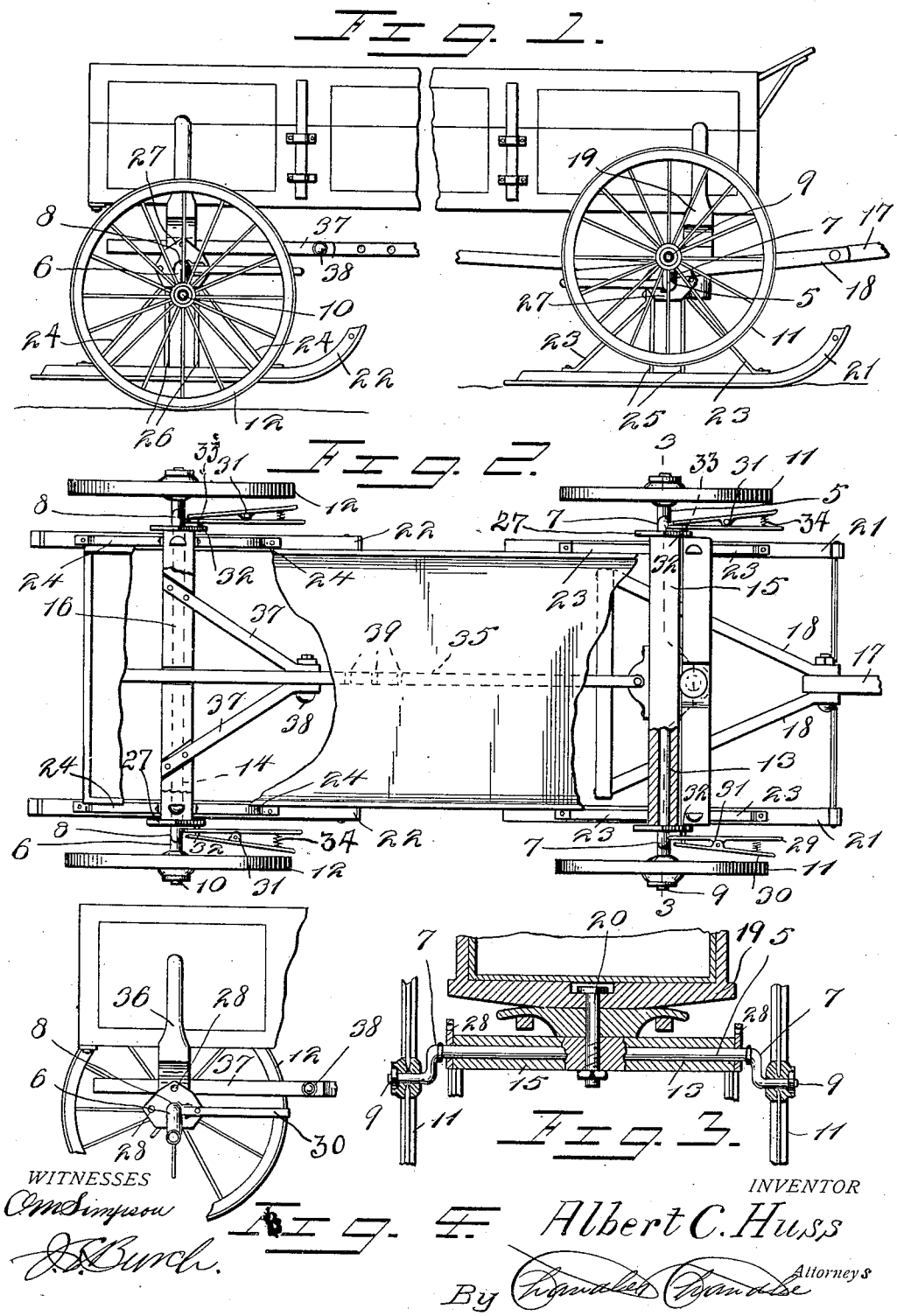

ALBERT CLEMENS HUSS, OF HESSEL, MICHIGAN.

WAGON.

1,052,059.  Specification of Letters Patent.  Patented Feb. 4, 1913.

Application filed October 16, 1911. Serial No. 654,873.

*To all whom it may concern:*

Be it known that I, ALBERT C. HUSS, a citizen of the United States, residing at Hessel, in the county of Mackinac, State of Michigan, have invented certain new and useful Improvements in Wagons; and I do hereby declare the following to be a full, clear, and exact description of the invention, such as will enable others skilled in the art to which it appertains to make and use the same.

This invention relates to wagons and more especially to a wagon provided with sled attachments whereby the same may be readily converted from a sled to a wheeled vehicle and in which the sleds will serve the purpose of a brake in descending hills.

An important object of the invention is to provide an improved construction for the mounting of the runners and wheels whereby the same may be shifted for engagement with the road surface independently or simultaneously and novel means for actuating the same.

With the above and other objects in view, the invention consists of certain other combinations and arrangements of parts as will be hereinafter more fully described and claimed, it being a still further object of the invention to provide a device which will not be likely to get out of working order.

In the drawings:—Figure 1 is a side elevation of my improved wagon with the forward wheels in a raised position and the rear wheels in engagement with a road surface and with sleds or runners reversely arranged. Fig. 2 is a top plan view of the invention partly in section to clearly illustrate the manner of supporting one of the axles. Fig. 3 is a sectional view on the line 3—3 of Fig. 2. Fig. 4 is a side elevation of the rear portion of the wagon with a wheel removed for disclosing the adjustment feature.

Referring to the drawings in detail, there is shown an improved wagon which consists of the front and rear axles 5 and 6 respectively and which are of arched formation providing elbows 7 and 8 at their extremities with reduced spindles 9 and 10 upon which the front and rear wheels 11 and 12 are respectively journaled against displacement and said axles are each engaged through longitudinal bores 13 and 14 in front and rear sled benches 15 and 16 respectively so that said axle may have free rotation therein for a purpose to be hereinafter made apparent. A draft member or tongue 17 is connected between the hounds 18 at the forward portion of the vehicle and the rear ends of the hounds are extended above the front bench and extended beneath a front bolster 19 and the bench member and the bolster are pivotally connected by a king bolt 20 extending through the front bench member and bolster for proper guidance of the vehicle through the front running gear thus formed.

Runners 21 and 22 are supported at opposite ends of the front and rear benches 15 and 16 respectively and are connected thereto by braces 23 and 24 respectively with intermediate vertical braces 25 and 26 and forming sled knees permitting proper movement of the runners in traveling over uneven road surfaces while one end of each of the bench members is formed with or has secured thereto, plate members 27 having their front, rear and top portions projecting beyond the faces of the benches and formed with openings 28 therethrough. A lever 29 is secured to the projecting extremity of each axle at one side of the vehicle at right angles to the elbow portions of the axles and each lever has a latch member 30 pivotally connected thereto by means of ears 31 secured to coacting faces of the levers and latch members respectively while the inner end of each latch member is provided with an engaging pin 32 extending inwardly at right angles thereto and operating through an opening 33 adjacent the inner end of the lever, said pin being held in position for normally engaging one of the openings 28 in the plate members 27 by means of a normally expanded coiled spring 34 connected between a lever and latch member outwardly of their pivotal connection, said spring serving to expand the outer ends of the parts connected and being adapted to be compressed by drawing the latch member and lever together for withdrawing the pin 32 from an opening whereby the lever may be swung in position to engage either one of the openings. By this adjustment, when the lever is in a forward position, the spindles of the axles will be lowered and the wheels will engage the road surface below the runners, while when the levers are in a rearward position the wheels will be raised for presentation of the runners upon the road surface and when the levers are in a vertical position the wheels will be partly lowered and the runners will serve as brakes to permit the vehicle to advance slowly in descending hills or when bringing the vehicle to a stop.

In the construction of the rear running gear of the vehicle, a reach bar 35 is connected to the forward bolster and bench member and at its rear end is connected to the rear bolster 36 and bench member 16 by means of hounds 37 which are engaged with the reach bar and adjustable longitudinally thereof by means of a displaceable pin 38 which is adapted to coact with a series of horizontal openings 39 spaced from the bar, thus providing an efficient wagon structure with sled or runner attachments whereby the same may be conveniently and quickly changed or converted from a sled to a wheeled vehicle and vice versa and in which the runners may also be employed as brakes in retarding the momentum of the wagon.

What is claimed is:—

1. In a vehicle, the combination with an axle having offset spindle ends and wheels mounted thereon; of a solid bench member having a continuous longitudinal bore rotatably receiving the axle, plates mounted on each end of said bench member and provided with a plurality of perforations, levers connected to the extremity of each axle outwardly of the plates, said plates having openings therethrough rotatably receiving the axle, said levers having pins coacting with the perforations to raise or lower the spindles and runners suspended from the bench member adjacent its ends.

2. A wagon, comprising front and rear axles having offset spindles, wheels mounted on said spindles, solid rectangular bench members having central longitudinal bores rotatably receiving the axles therethrough, front and rear running gears connected to said bench member, the front running gear being pivoted to said front bench, runners connected to each of the bench members inwardly of the wheels, flat metallic plates secured to the ends of each bench member and rotatably receiving the axles therethrough, said plates extending above the bench members and provided with a plurality of perforations relatively arranged concentrically to the axle, a lever connected to the extremity of each axle and a spring pressed latch having a pin projecting laterally through the lever and adapted to engage one of the perforations of the plate members for holding the spindles in raised or lowered position for disposing the wheels and runners independently or simultaneously in engagement with the road surface.

In testimony whereof, I affix my signature, in presence of two witnesses.

ALBERT CLEMENS HUSS.

Witnesses:
JOHN F. BULLARD,
JASPER ST. LOUIS.